(12) United States Patent
Hansen et al.

(10) Patent No.: US 9,143,740 B2
(45) Date of Patent: Sep. 22, 2015

(54) ELECTRO-SCAN INTEGRATION INTO VIDEO PIPE INSPECTION VEHICLE

(71) Applicant: Electro Scan, Inc., Sacramento, CA (US)

(72) Inventors: Charles Hansen, Sacramento, CA (US); Robert Jackson Harris, Shingle Springs, CA (US)

(73) Assignee: Electro Scan, Inc., Sacramento, CA (US)

( * ) Notice: Subject to any disclaimer, the term of this patent is extended or adjusted under 35 U.S.C. 154(b) by 342 days.

(21) Appl. No.: 13/906,034

(22) Filed: May 30, 2013

(65) Prior Publication Data

US 2013/0321613 A1    Dec. 5, 2013

Related U.S. Application Data

(60) Provisional application No. 61/689,248, filed on Jun. 1, 2012.

(51) Int. Cl.
*H04N 7/18* (2006.01)
*G01M 3/00* (2006.01)
*G01M 3/40* (2006.01)

(52) U.S. Cl.
CPC ............. *H04N 7/18* (2013.01); *G01M 3/005* (2013.01); *G01M 3/40* (2013.01)

(58) Field of Classification Search
None
See application file for complete search history.

(56) References Cited

U.S. PATENT DOCUMENTS

| 5,892,163 | A | 4/1999 | Johnson |
| 6,301,954 | B1 | 10/2001 | Schuberth et al. |
| 2003/0023404 | A1 | 1/2003 | Moselhi et al. |
| 2012/0069172 | A1* | 3/2012 | Hudritsch ................. 348/84 |

FOREIGN PATENT DOCUMENTS

JP         4751991 B2     8/2011

* cited by examiner

*Primary Examiner* — Anner Holder
*Assistant Examiner* — Nam Pham
(74) *Attorney, Agent, or Firm* — Heisler & Associates

(57) ABSTRACT

A camera based sewer evaluation vehicle has an electro-scan pipe defect detection system integrated therein. A cable and winch of the camera based system are utilized to support either a camera or an electro-scan probe. A signal transmitted through the cable is passed along for processing of signals received through the cable for final output and analysis, such as on a common computer. To facilitate electro-scan probe based pipe defect detection, a ground rod is utilized. The system can include a funnel plug downstream of the electro-scan probe for interconnection to a haul line and to assist in maintaining a liquid filled status in the pipe adjacent the electro-scan probe. A downstream bypass funnel plug or a blockage of some form can operate within and past a downstream manhole adjacent the pipe to keep the pipe filled with liquid.

16 Claims, 9 Drawing Sheets

ELECTRO-SCAN INTEGRATION INTO VIDEO PIPE INSPECTION VEHICLE

CROSS-REFERENCE TO RELATED APPLICATIONS

This application claims benefit under Title 35,United States Code §119(e) of U.S. Provisional Application No. 61/689,248 filed on Jun. 1, 2012.

FIELD OF THE INVENTION

The following invention relates to sewer line and other pipe defect detection systems which utilize an electric signal correlating with the flow of electric current through defects in walls of the pipe. More particularly, this invention relates to vehicle supported pipe defect detection systems which can utilize both a camera and an electric probe through a common defect detection signal cable.

BACKGROUND OF THE INVENTION

Sewer pipe (and other related buried pipe) defect detection is an important part of pipe maintenance. Sewer lines are configured to prevent leakage into or out of the sewer lines for optimal performance. When defects exist in the sewer pipe, such that leakage can occur, sewer system performance is degraded and the potential for environmental hazards exists. One common method for sewer line defect detection is to pass a video camera through the sewer line and to view interior surfaces of the sewer line directly. A second method for sewer line defect detection is to utilize an electric probe and measure electric current flow through walls of the sewer pipe, to correlate this current through the sewer pipe walls to evaluate electric current flow through the pipe walls, indicative of any defects in the sewer line. Such identification systems are referred to as "electro-scans."

One common way to deploy a video camera through a sewer line is to provide a vehicle which has an electric signal transmitting cable mounted upon a spool, and typically coupled to a winch which can control the playing out of cable off of the winch and with a camera attached to a free end of the cable. An attached end of the cable opposite the free end receives a signal from the camera (typically through slip rings on the spool of the winch). This camera signal is routed to a camera signal terminal which can provide processing of the camera signal and power a display for viewing of the signal (also generally referred to as a camera signal evaluation station). Other functions performed by the station, functioning as a camera signal processor, can include image data storage. Typically a position encoder is provided adjacent where the cable is played off of the winch which can measure an amount of cable which has been played off of the winch, to correlate camera image data with a position of the camera within the sewer line. In this way, camera image data is correlated and position data within the sewer line can be joined for analysis and interpretation.

Typically a tractor is coupled to the camera within the sewer line or other pipe. The tractor pulls or otherwise advances the camera through the sewer line while the signal cable follows behind and transmits the signal back to the vehicle. A joystick is typically provided at the evaluation station which allows for control of the winch associated with the spool and for tractor control, and also can provide additional features such as pan and tilt features on the camera for more detailed control of the orientation of the camera as it passes through the sewer line being evaluated. To provide all of these functions, the signal transmission cable typically includes a power line, and multiple separate conductors to provide for transmission of separate signals (in other embodiments a two-conductor cable, such as a coaxial cable, suffices). For instance, a camera control signal can pass from the vehicle down to the camera while camera image signal detail can pass on a separate conductive pathway (or the same conductor) back to the vehicle. A power signal can pass along an electric conductor to power the camera for image signal generation as well as to power servo motors to control, pan and tilt operation for the camera and motion of the tractor.

Vehicles which deploy such camera based sewer line (fault) detection systems can be quite elaborate in the features that they provide. For instance, a vehicle can be in the form of a van with a signal evaluation station having large high quality video monitors, high powered computation devices, large spools for signal transmission cable storage, electric power supply for powering of the equipment and other accessories to support the process of deployment and retrieval of the camera and signal transmission cable down into a manhole accessing of the sewer line, as well as to provide a quality work environment for trained technicians to operate the equipment and evaluate signals produced by the equipment. In other embodiments, the vehicle could be a trailer towable by another vehicle.

Electro-scan probe sewer (and pipe) defect identification systems known in the prior art provide useful information as to sewer line performance and the existence of any defects therein. Such electro-scan probe defect detection systems can in many instances provide data which more reliably identifies defects that can leak within the sewer lines and which is complementary with camera data, which is not able to provide accurate predictions of liquid infiltration into the pipe. Beneficially, electro-scan probe based defect detection is not based on an operator visually detecting anomalies within the imaging signal which might represent a defect, but rather the presence of a defect is identified electronically. Thus, a need exists for utilizing the features of camera based sewer defect evaluation vehicles with electro-scan probe sewer defect detection systems.

SUMMARY OF THE INVENTION

With this invention, in one embodiment a dual purpose vehicle is provided which is configured to perform sewer (and other pipe) defect identification both with a video camera and an electro-scan probe. In a preferred form, this invention minimizes the necessity of duplication of equipment associated with separate video camera based and electro-scan probe based defect detection systems. In particular, the vehicle itself and the signal transmission cable, as well as associated winches and cable deployment distance sensor equipment can be commonly used by both systems. Optionally, other systems can also be jointly used by both systems as well, such as a computer monitor, a computer, a power supply for equipment on the vehicle, a joystick or other user control input, as well as various tools utilized for deployment and retrieval of the free end of the signal transmission cable.

A free end of the cable is fitted with a coupling which can removably attach to a video camera or to an electric probe. Within the vehicle, preferably a data signal which is transmitted by the cable to the vehicle is transmitted to a signal interconnection, such as through slip rings on the spool coupled to an integration terminal. This data signal and potentially power for operating the camera and/or electric probe systems are preferably interconnected through a yoke that provides one form of signal interconnection output which can be removably attached to either a camera terminal, functioning as at least a portion of a camera signal evaluation station, or an electro-scan probe terminal, functioning as at least a portion of an electric probe signal evaluation station. Appropriate electronics are associated with each terminal which uniquely handles the data signal and potentially also handles the power to be passed between the free end of the cable and a selected one of the terminals.

When the video camera is attached to the free end of the cable, the yoke is attached to the camera terminal or other common signal processor. The system is thus configured to supply appropriate power to operate the camera as well as input signals to the camera and a video signal is transmitted from the camera to the camera terminal for processing and transmission to a computer monitor for viewing by an operator, as well as archiving of the signal. Positioning data associated with the position of the camera is also correlated with this signal in a preferred embodiment with such position data typically added to the signal before the signal is passed to the camera terminal, but optionally passed directly to the camera terminal and correlated with the video signal by the camera terminal itself.

When operating utilizing the electro-scan probe, the system is reconfigured to have the camera replaced with the electro-scan probe at the free end of the cable. The yoke is removed from the camera terminal and instead attached to the electro-scan probe terminal or other electro-scan probe signal processor. When so connected, an electric current signal correlating with electric current sent by the probe, and typically also electro-scan probe position data such as that provided by a distance encoder pulley about which the cable is routed, are passed through the yoke to the electro-scan probe terminal. This electro-scan probe terminal is also preferably coupled to a ground rod or other grounding element or source of "ground" reference for completion of an electric circuit. The electro-scan probe terminal also performs functions such as analyzing the electric current signal, data and position data, conditioning the data, calibrating the data, normalizing the data, archiving the data and transmitting the data to a display in a format which can be viewed and understood by an operator.

Once so equipped, the vehicle can be configured for operation with a video camera or with an electric probe, to obtain the information desired. The vehicle avoids the necessity of carrying redundant equipment by utilizing a common signal transmission cable, and other common equipment within the vehicle. Other equipment can also be provided as part of the system to enhance system performance, especially when operating in electro-scan probe sensing mode. In particular, a side wedge pulley can be fitted within a manhole through which the electro-scan probe accesses the pipe. This side wedge pulley provides for convenient routing of the cable down into the pipe, such as a sewer line, without causing damage to the cable or the manhole. The side wedge pulley also provides for the center of the electric probe, the defect sensing region, to be centered in the middle of the manhole. Thus, an accurate start position is established and the connection between the manhole and the downstream pipe is electro-scanned. Conventional routing pulleys do not provide this functionality.

A funnel plug is preferably provided between the electro-scan probe and the haul line. This funnel plug acts to keep the electro-scan probe submerged and the sewer line substantially completely full in the region of the electric probe without requiring the entire manhole-to-manhole section of the pipe to be surcharged, for the best and most complete pipe wall defect detection signal to be acquired.

A downstream bypass funnel plug can also be provided downstream of the pipe being evaluated, which allows the pipe to be kept full of liquid at the desired level when the funnel plug exits the pipe at the downstream manhole and to cause the electric probe to be submerged and acquire the desired signal for the entire circumference of the pipe and the connection between the pipe and the downstream manhole.

Once so identified, an inspection of the pipe segment of interest with camera video data can be beneficial to determine what type of repair might be called for at the defect site. Thus, a most effective overall sewer line defect detection system benefits from utilizing existing camera defect viewing equipment and to deploy both camera based and electro-scan probe based defect detection systems from a common vehicle for ease of deployment in the field and to maximize the effectiveness of an overall defect identification and evaluation system.

OBJECTS OF THE INVENTION

Accordingly, a primary object of the present invention is to provide a vehicle which can support deployment of both a sewer line video camera and a sewer line electro-scan probe for defect identification utilizing either the camera or the electro-scan probe.

Another object of the present invention is to provide a retrofit for a video camera based visual sewer defect detection vehicle to allow the vehicle to operate using an electro-scan pipe defect identification probe.

Another object of the present invention is to provide a system for sewer line defect detection which utilizes an electro-scan probe passing through a sewer line which is coupled to a vehicle with equipment thereon for effectively deploying the electro-scan probe, monitoring a precise position of the probe, controlling signal cable coupled to the probe and acquiring, processing and displaying information received from the probe correlating with sewer line defects and operational characteristics.

Another object of the present invention is to provide a system for more reliably identifying defects in sewer lines, capable of leaking liquids into or out of the sewer line.

Another object of the present invention is to provide a method for adapting a sewer defect identifying vehicle from video camera based detection to electro-scan detection or combined camera and electro-scan based defect identification.

Another object of the present invention is to provide a method for evaluating the condition of sewer lines which detects the position and magnitude of defects with high reliability.

Another object of the present invention is to provide a sewer line defect identification system which is easy to deploy and which provides reliable data and which exhibits reliable long life performance with minimal maintenance.

Another object of the present invention is to provide a system for evaluating the condition of underground pipelines based on a signal received from an electro-scan probe passing through the underground pipeline.

Another object of the present invention is to provide a pipe defect identification system which can identify a defect that can leak whether or not it is actively leaking at the time of pipe defect identification.

Other further objects of the present invention will become apparent from a careful reading of the included drawing figures, the claims and detailed description of the invention.

BRIEF DESCRIPTION OF THE DRAWING FIGURES

Figure 2:
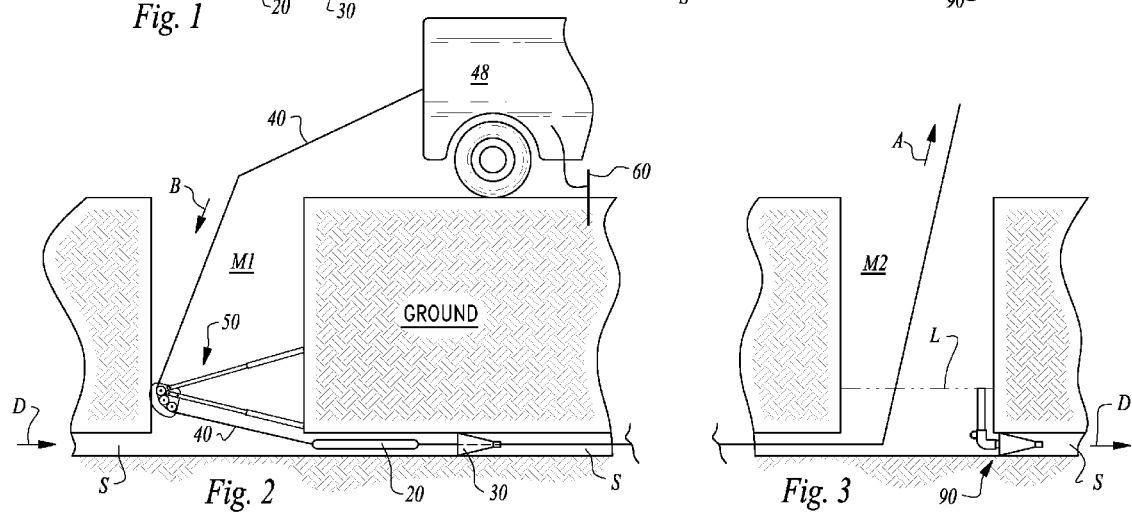
FIG. 2 is a side elevation view of a first portion of that which is shown in FIG. 1 depicting where the electro-scan probe passes into the sewer line through a first manhole and with a signal transmission cable extending from the electro-scan probe to a vehicle on the surface.
Figure 4:
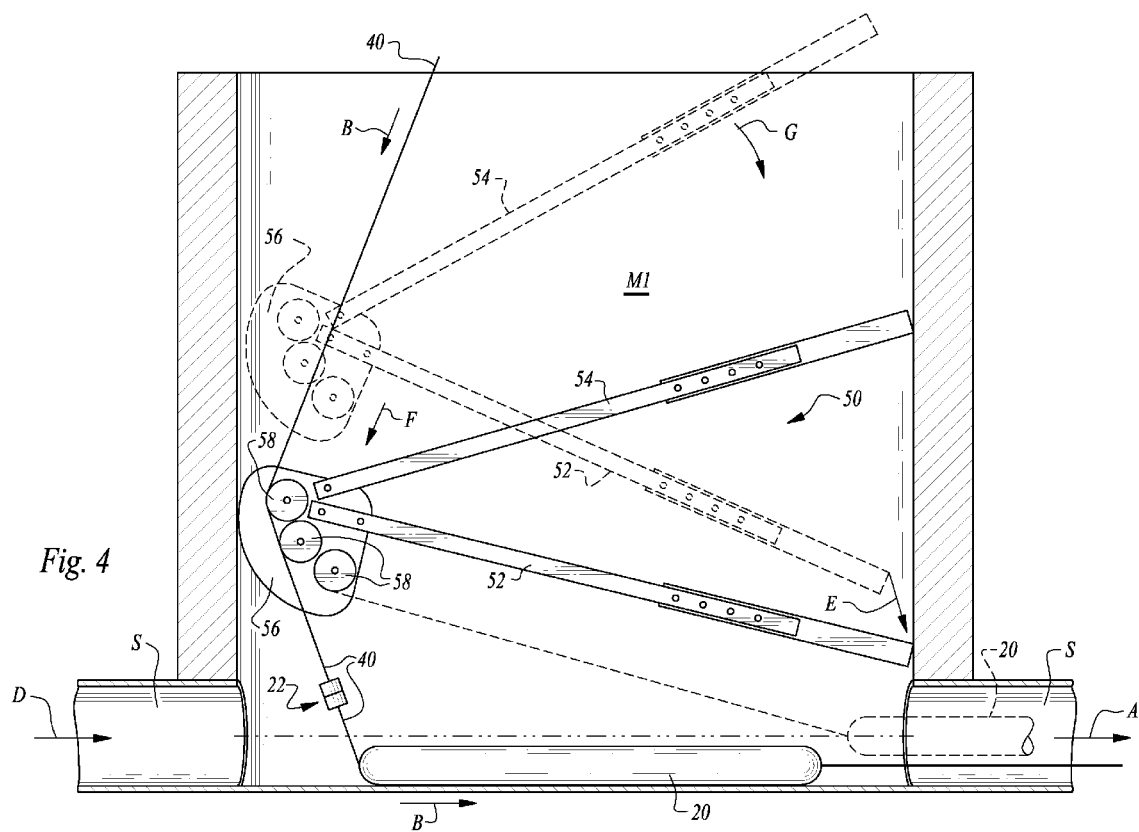

FIG. 4 is a side elevation view providing a detail of a portion of that which is shown in FIG. 2 with a side wedge pulley in position for most desirably routing the signal transmission cable through the manhole and into the sewer line, and further showing in broken lines initial positions of arms of the side wedge pulley before positioning of the side wedge pulley and also illustrating electric probe deployment into the sewer line at the beginning of the sewer line defect detection process.

Figure 5:
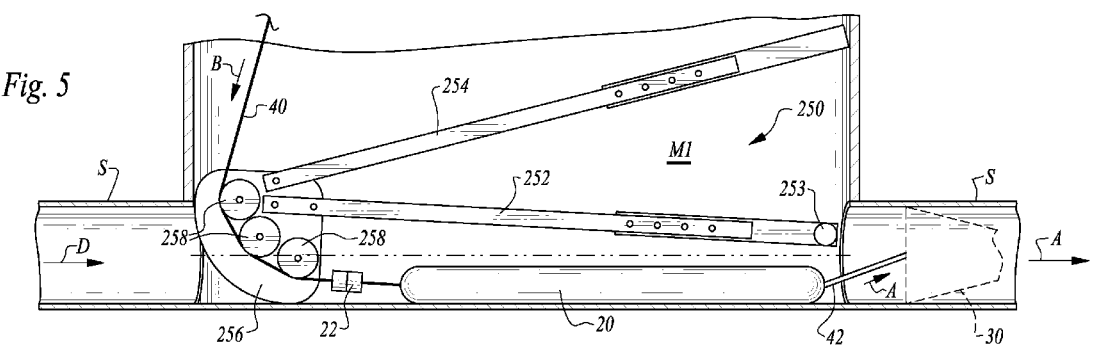

FIG. 5 is a side elevation view of a lower end of the first manhole with an alternative embodiment side wedge pulley fitted therein.

Figure 6:
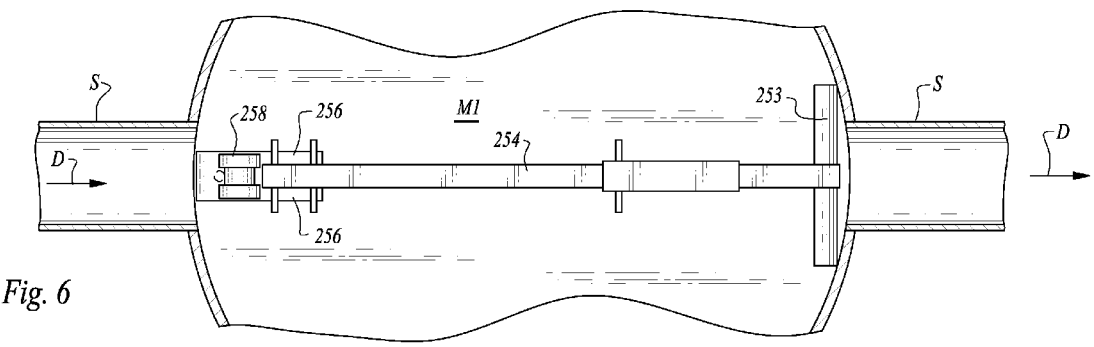

FIG. 6 is a top plan view of that which is shown in FIG. 5.

Figure 7:
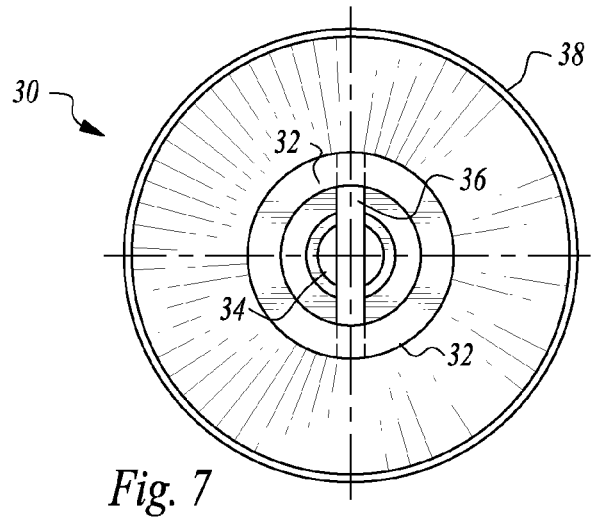

FIG. 7 is an end elevation view of a funnel plug for positioning between the electro-scan probe and the haul line and to assist in keeping the sewer line filled at the location of the electro-scan probe.

Figure 8:
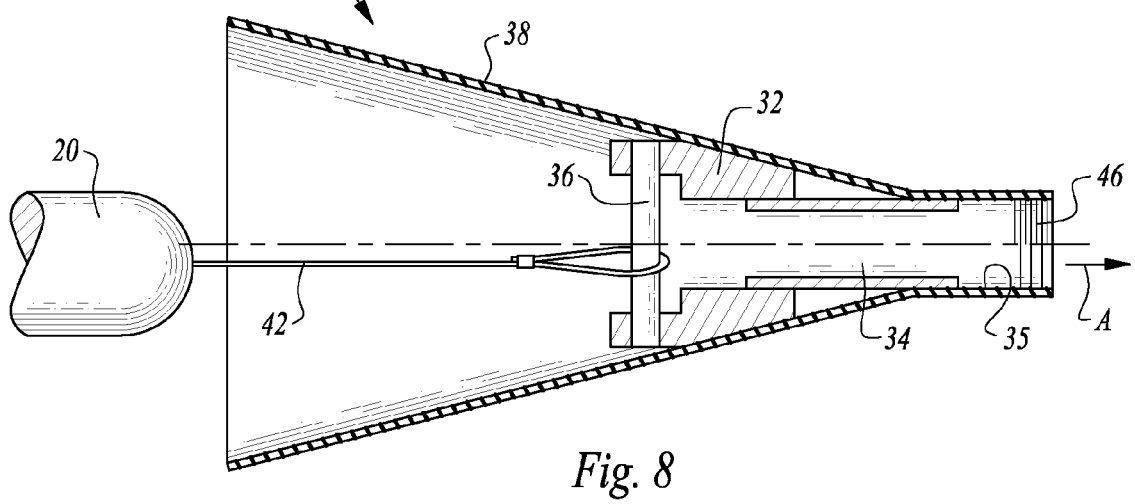

FIG. 8 is a side elevation full sectional view of the funnel plug of FIG. 7 and also showing the haul line and an electro-scan probe cable for connection of the electro-scan probe to the funnel plug and to the haul line.

Figure 9:
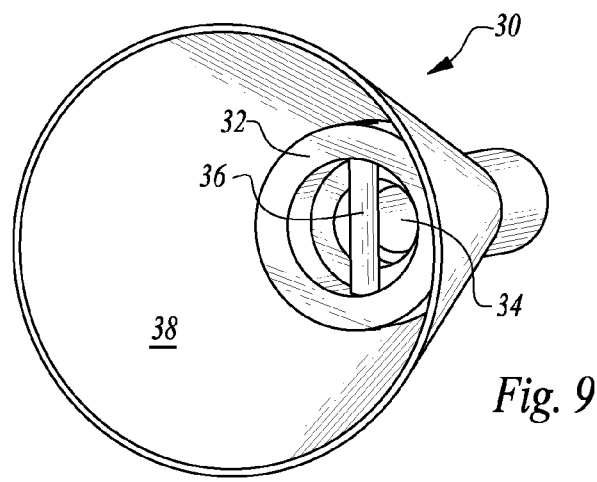

FIG. 9 is a perspective view of that which is shown in FIG. 8.

Figure 3:
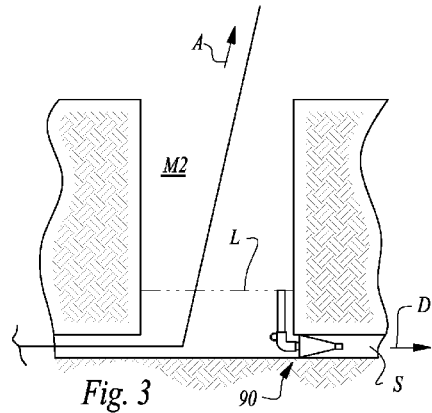
FIG. 3 is a side elevation view of a portion of that which is shown in FIG. 1 depicting where a haul line accesses the sewer downstream of the electro-scan probe for applying a force to pull the electro-scan probe through the sewer line, and also showing a downstream bypass funnel plug in position flooding portions of the sewer line being evaluated.
Figure 10:
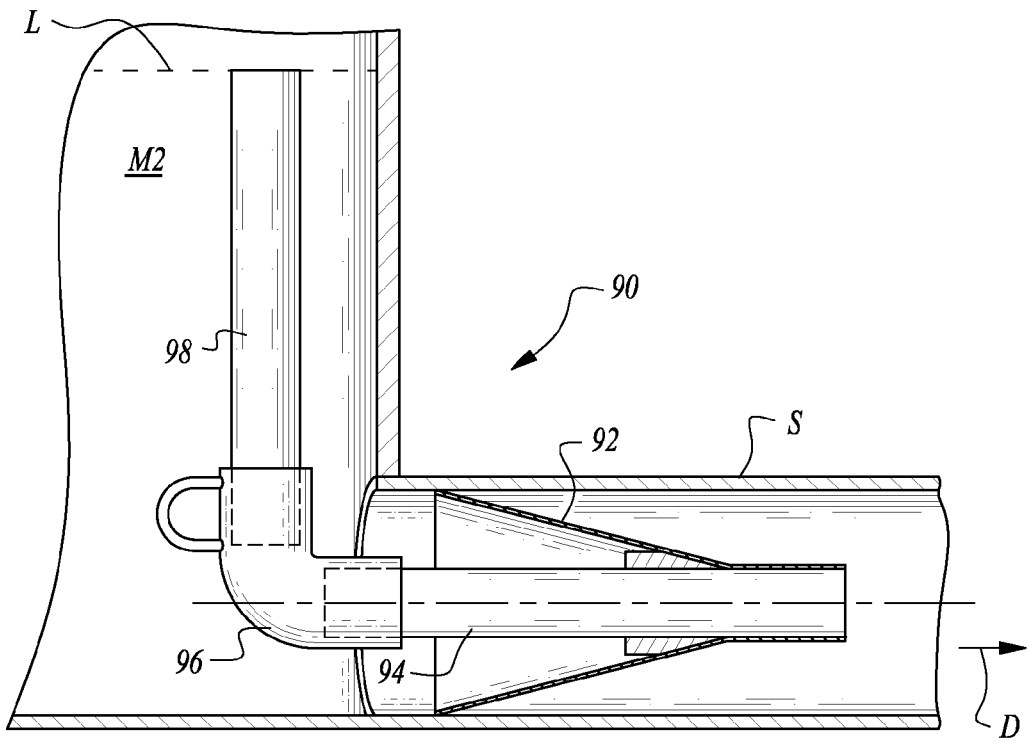

FIG. 10 is a side elevation view of a second manhole downstream of the first manhole, in the form of a detail of a portion of that which is shown in FIG. 3 and depicting how the downstream bypass funnel plug is positioned and can maintain a liquid level within a downstream portion of the sewer system being monitored, such that the sewer line is kept filled with liquid while the funnel plug and the electro-scan probe passes into the downstream manhole.

Figure 11:
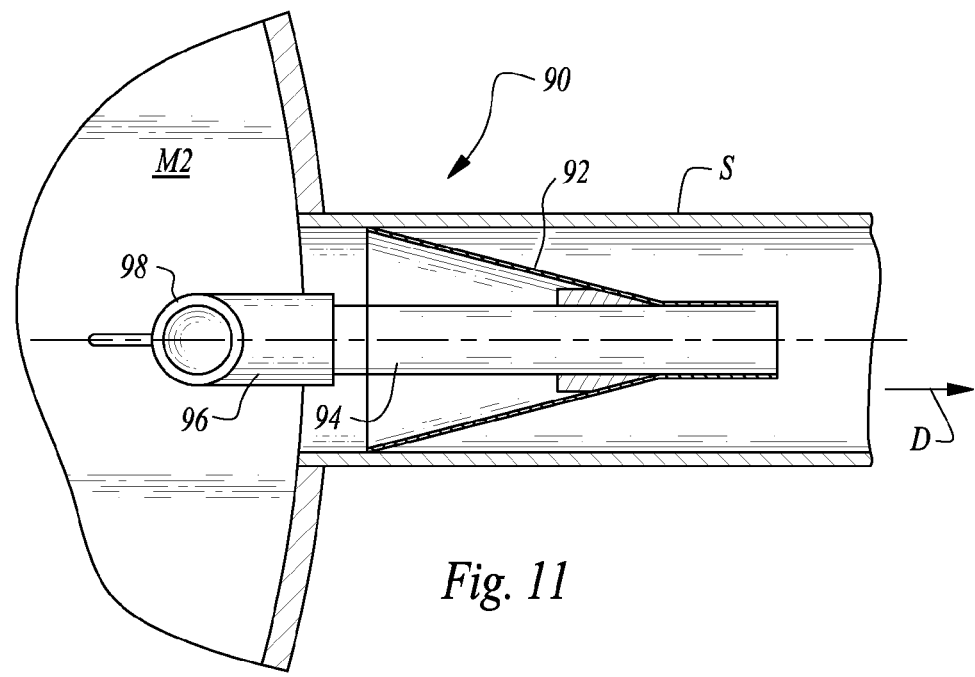

FIG. 11 is a top plan view of that which is shown in FIG. 10.

Figure 12:
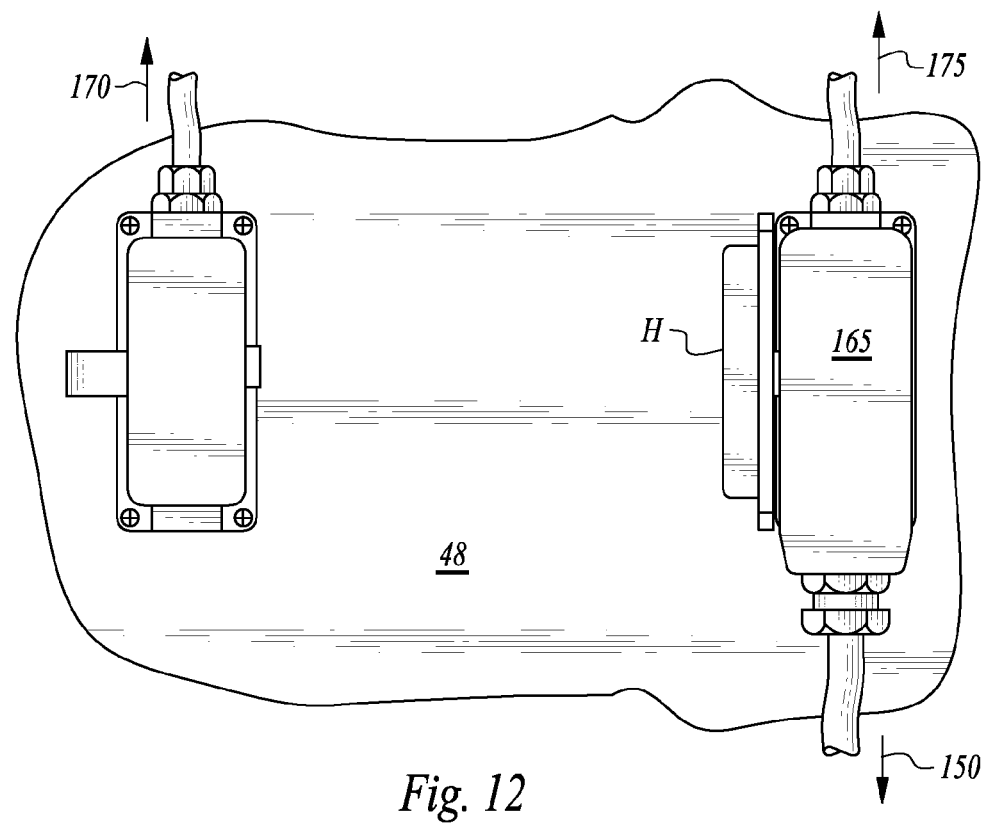

FIG. 12 is an elevation view of equipment beyond an integration terminal, showing a yoke, camera terminal and electric probe terminal mounted within a vehicle and with the yoke in a position connecting the integration terminal to the camera terminal.

Figure 13:
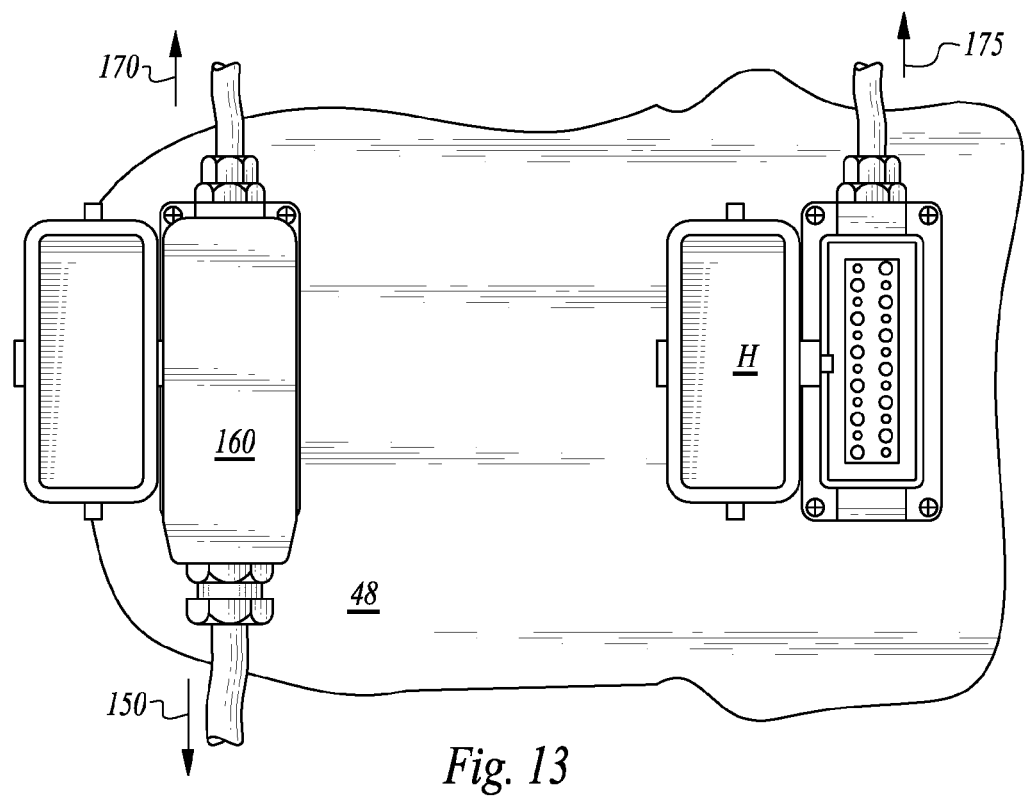

FIG. 13 is an elevation view similar to that which is shown in FIG. 12 but with the yoke coupled to the electric probe terminal.

Figure 14:
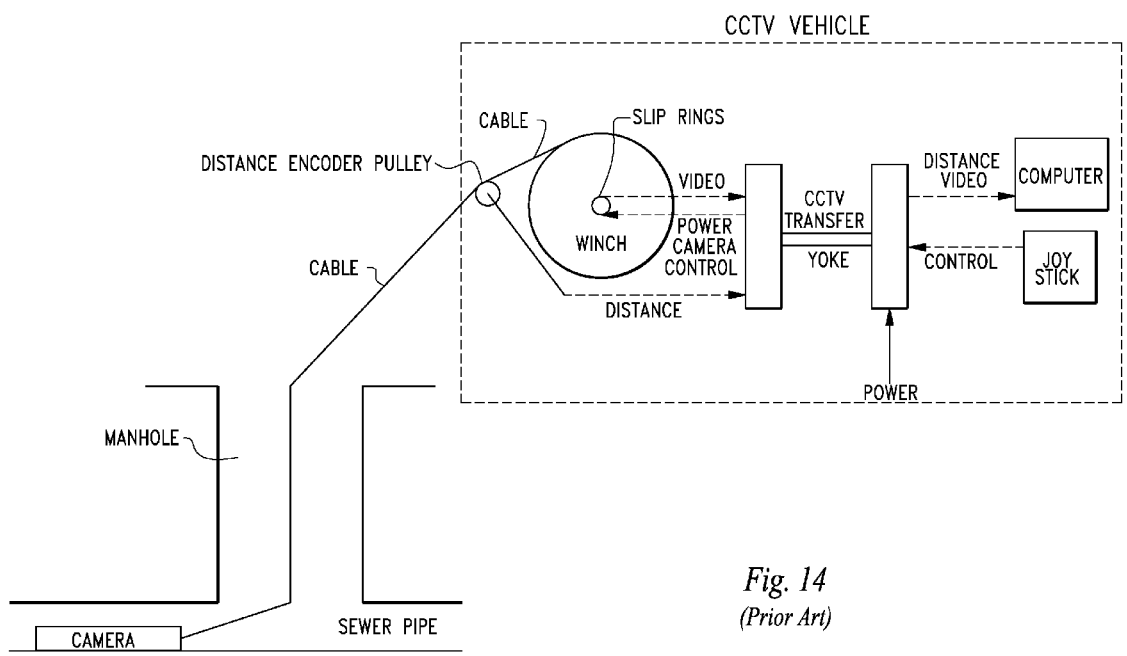

FIG. 14 is a schematic view of a closed circuit television (CCTV) or other video camera vehicle according to the prior art and which can be adapted according to this invention to operate with an electro-scan probe for sewer defect identification.

Figure 15:
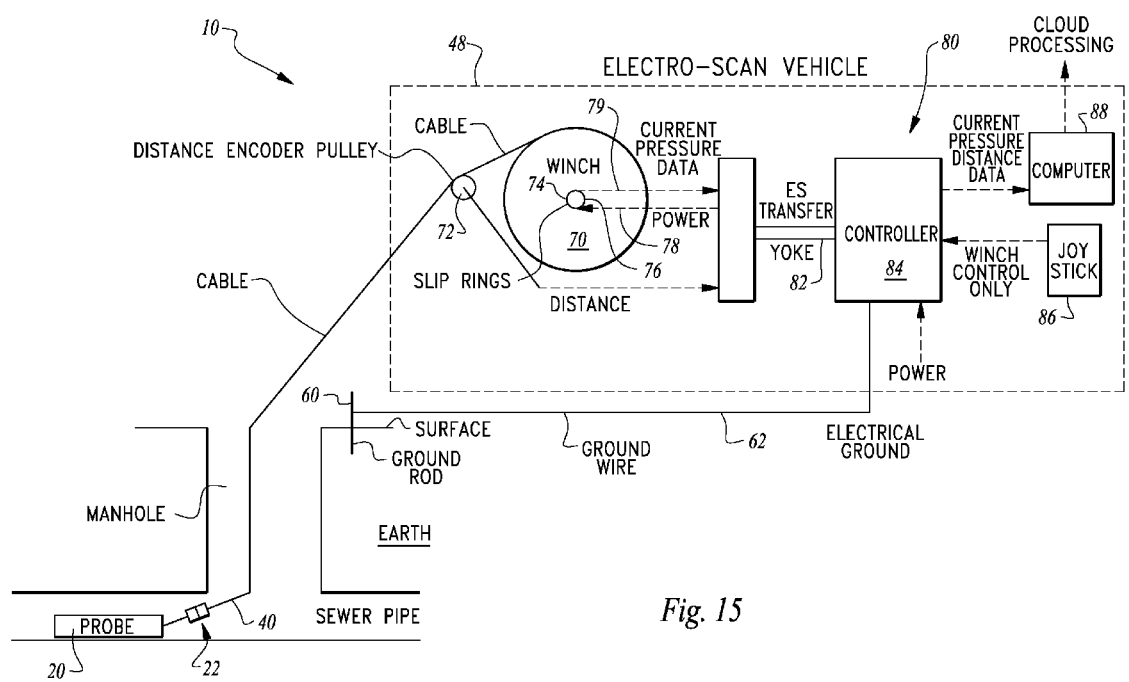

FIG. 15 is a schematic similar to that which is shown in FIG. 14 but after the vehicle has been modified for electro-scan utilizing the electro-scan probe according to this invention.

Figure 16:
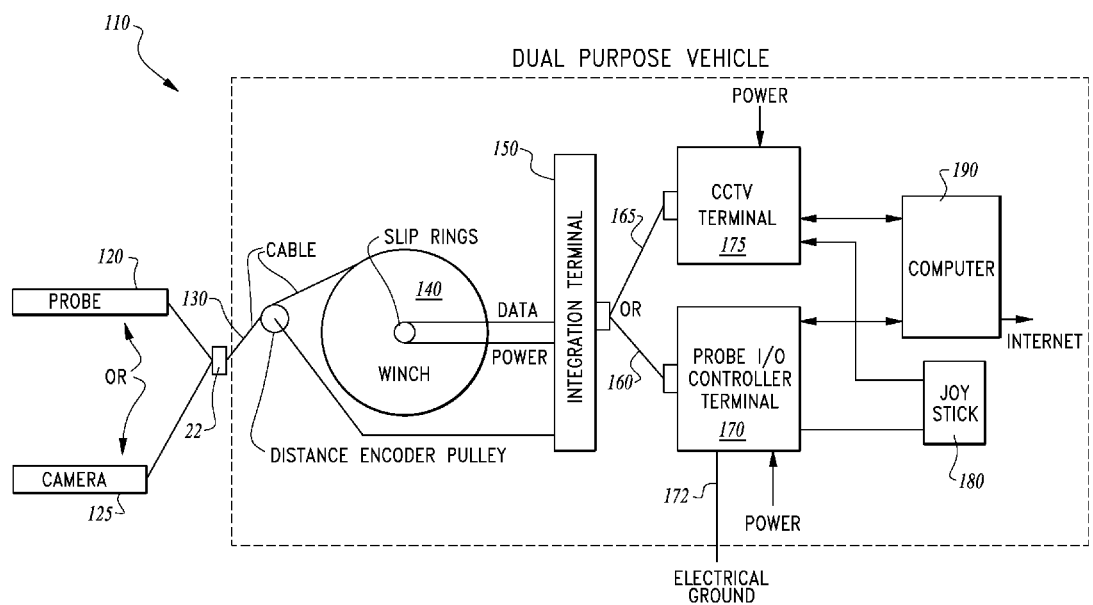

FIG. 16 is a schematic of a dual purpose vehicle which is configured to both operate with a camera for sewer defect visualization and with an electro-scan probe for sewer line defect identification.

DETAILED DESCRIPTION OF THE PREFERRED EMBODIMENT

Figure 1:
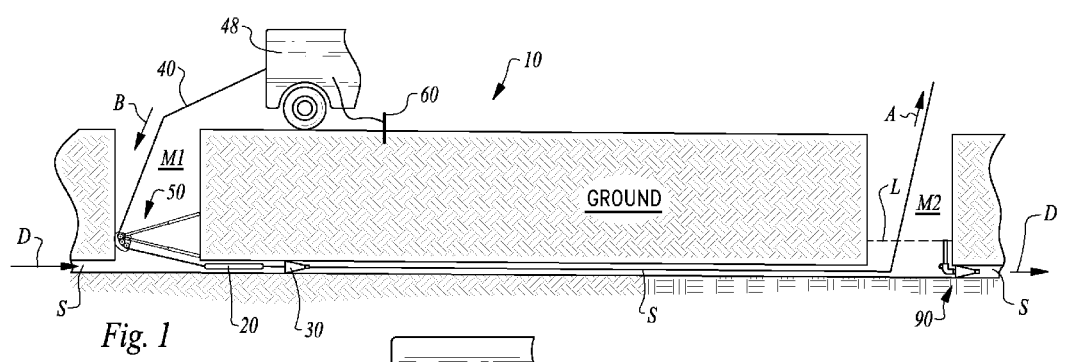
FIG. 1 is a side elevation view of a simplified sewer or other underground pipe and access manholes, showing the system and method of this invention in operation to identify defects within the pipe.

Referring to the drawings, wherein like reference numerals represent like parts throughout the various drawing figures, reference numeral 10 is directed to a system for integrating an electro-scan probe 20 based sewer defect identification methodology with a camera 125 based sewer visualization system 110 (FIGS. 14-16). Many camera 125 based sewer evaluation systems are logistically supported within a vehicle, such as the vehicle 48 (FIGS. 1 and 14). Rather than provide an electro-scan probe 20 (FIGS. 1-3) based sewer defect detection system as its own standalone package, with this invention the electro-scan probe 20 based sewer defect identification system 10 is integrated with a vehicle 48 which previously supported camera 125 based sewer inspection equipment, for either single purpose electro-scan probe 20 based sewer defect identification or a combination of electro-scan probe 20 based sewer defect identification and camera 125 (FIG. 16) based sewer inspection. In this way, equipment common to both electro-scan probe 20 analysis and camera 125 analysis can be commonly used to most efficiently utilize logistical resources which are already in place.

Preliminarily, and primarily with reference to FIG. 14, details of one form of existing camera 125 (FIG. 16) based sewer inspection is described, and to which the integration system 10 (FIGS. 1 and 15) of this invention is particularly directed. The system 10 is most preferably deployed in the form of a dual purpose vehicle according to system 110 (FIG. 16) to provide both electric probe 120 based sewer defect identification and camera 125 based sewer inspection.

With reference to FIG. 14, various elements of the prior art camera based sewer inspection system are supported by a vehicle, such as a CCTV (closed circuit television) vehicle. The vehicle includes support for a signal transmission cable, such as by allowing it to be stored up onto a spool which is preferably coupled to a winch for power control of the spool to play off and gather up the cable as required by the system. A distance encoder pulley is preferably provided adjacent the cable to measure an amount of cable which has been played off of or drawn back up onto the winch, which encoder acts as one form of a camera position sensor by measuring a distance away from the vehicle that the camera has traveled, based on the amount of cable which has been deployed off of the winch. A camera (typically a video camera, such as a CCTV camera) is routed through an input manhole M1 (FIG. 1) and into a sewer line or other pipe S (FIG. 1) where inspection can occur. Typically, a tractor is coupled to the camera to move the camera through the sewer pipe, while the signal transmission cable follows behind.

The vehicle includes interconnection to the spool of the winch, such as through slip rings to provide power to the camera and also to provide control signals to the camera and to deliver a video signal back from the camera. These various different inputs and outputs are transmitted through the slip rings of the winch to a power camera control which acts as a form of signal interconnection which can optionally provide some conditioning of the signal, some conditioning of the power, and can take the signal and correlate it with data from the distance encoder which relates to a position of the camera. This signal and other signals such as control signals and power are transferred through a yoke to a camera (CCTV)

terminal. This CCTV terminal receives control from a joystick or other cable position input controller which can control the winch (and tractor) for movement of the camera away from the vehicle, as well as to control the camera, such as in ways to control pan and tilt of a lens of the camera, and also potentially zoom and other aspects of camera control (such as exposure and other viewing optimization controls known in the art or hereafter developed).

This CCTV terminal also receives power from a source of power which is preferably mounted upon the vehicle. Finally, the CCTV terminal communicates with a computer and associated monitor so that images associated with the signal transmitted along the cable can be viewed by an operator. The computer or other equipment can also facilitate storage for archiving of the image data. By housing all of this equipment on a mobile platform in the form of a vehicle, it can be driven to a site where a sewer line is to be inspected and operators can comfortably work in a controlled environment to gather and analyze image data received from the camera. While the vehicle is typically self-propelled, such as in the form of an enclosed van, the vehicle can be in the form of a trailer that is towed into position for use.

In essence, and with particular reference to FIGS. 1 and 15, basic details of the system 10 of this invention, when configured to operate including at least the electro-scan probe 20 for sewer defect identification, is described according to an exemplary embodiment. The system 10 includes an electro-scan probe 20 having an elongate cylindrical form and adapted to pass through a pipe such as a sewer S (FIGS. 1-5). This electro-scan probe 20 is preferably of a type such as that described in detail in U.S. Pat. No. 6,301,954, incorporated herein by reference in its entirety and by inclusion of a copy of this patent in an Appendix to this application.

The probe 20 has a distal end preferably coupled to a funnel plug 30, which is in turn preferably coupled to a haul cable 46. Tension in the haul cable 46 (along arrow A of FIG. 8) causes the probe 20 to be drawn through the sewer S, such as in a downstream direction (arrow D of FIGS. 1-3). The funnel plug 30 assists in keeping the probe 20 submerged in the sewer line S, and the sewer line S substantially filled adjacent the probe 20 to maximize the effectiveness of the probe 20 in detecting defects that can leak, associated with a conductive pathway through walls of the sewer line S.

The probe 20 is also coupled to a main cable 40 configured to provide transmission of a signal from the probe 20 to a vehicle 48 where other portions of the system 10 are located, for signal data collection, archiving and interpretation, among other functions. To facilitate passage of this main cable 40 into the sewer S through a manhole M1, a side wedge pulley 50 is preferably positioned within the manhole M1. This side wedge pulley 50 fits within the manhole M1 in a secure manner and positions at least one pulley in position to allow the main cable 40 to be effectively routed from the vehicle 48 down to the probe 20, without causing damage to the manhole M1, sewer lines S or the main cable 40.

A ground rod 60 or other grounding equipment are preferably included within the system 10, such as by integration through the vehicle 48. The ground rod 60 allows for closing of an electric circuit which passes from the ground rod 60, through portions of the system 10 within the vehicle 48 to the main cable 40, and then from the main cable 40 to the probe 20, and finally through liquids within the sewer line S and through any defects in walls of the sewer line S, back to ground associated with the ground rod 60. The magnitude of current flow in this circuit is measured and the position of these measurements are correlated with distance. Through study of this data, the differences between a properly functioning section of sewer line S and a defect which is allowing a liquid to pass through a wall of the sewer line S, can be identified, quantified, characterized and otherwise analyzed.

With continuing reference to FIG. 15, the main cable 40 is preferably partially stored upon a spool of a winch 70. The winch 70 or other spool support is further interconnected to an analysis assembly 80 so that a signal from the main cable 40 can be transmitted to a computer 88 or other data analysis tool with reference to ground, so that the data can be analyzed, conditioned, archived and otherwise beneficially used.

In some forms of the invention, to ensure that the sewer line S is full of liquid L adjacent the probe 20, a downstream bypass funnel plug 90 can be utilized (FIGS. 1, 3, 10 and 11). The downstream bypass funnel plug 90 is configured so that a liquid level L is maintained within a downstream second manhole M2 which is sufficiently high that upstream portions of the sewer line S are filled with liquid and the probe 20 can provide the most reliable information as to the status of walls of the sewer line S. In other installations it can be beneficial to utilize a blockade, such as a sewer plug, especially for larger diameter sewer S or other pipes. Such a plug would have some form of bypass to allow some liquid flow and would be located downstream of the downstream manhole M2.

In a preferred form of the invention, the system 10 is modified to function with a dual purpose vehicle so that a system 110 is provided which can provide sewer defect identification and analysis both with a video camera 125 and with a probe 120 (FIG. 16). In particular, the same main cable 40, 130 is utilized and the user selects whether to attach the camera 125 or the probe 120 to the sensor end of the cable 40, 130. The cable 130 is configured to handle both data transfer and power and control signals, with these different conductive pathways within the cable 130 used or not used depending on whether the probe 120 or camera 125 are attached to the free end of the cable 130.

An attached end of the cable 130 opposite the free end is coupled to a spool associated with a winch 140 or other spool support. Slip rings or other interconnections allow for power and data to be transmitted to the cable through the winch and to an integration terminal 150. This integration terminal provides one form of a signal interconnection between the end of the cable opposite the free end and either a camera terminal 175 or a probe terminal 170.

In particular, the integration terminal 150 preferably has data received from the probe 120 or camera 125 through the cable 130 correlated with distance data from the distance encoder pulley, which correlates with a position of the probe 120 or camera 125. Other preconditioning of the signal can also be provided through the integration terminal 150 and potentially power can be separately supplied to the integration terminal 150. A yoke extends from the integration terminal 150. In a preferred embodiment, this yoke is only a single yoke but can be referred to as an electric signal yoke 160 or a camera yoke 165 depending on whether this yoke is attached to the camera terminal 175 or the electric probe 170.

The camera terminal 175 is coupled to a computer 190 and associated monitor, and also to a joystick 180 or other input controller. The electric probe terminal 170 is preferably coupled to or otherwise provided with reference to electrical ground, such as through a ground wire 62 coupled to a ground rod 60 embedded in the ground, and can also be coupled to a computer 190 with associated monitor and a joystick 180 or other input, such as to control a positioning of the free end of the cable 130 by operation of the winch 140. The terminals 170, 175 preferably receive power as well.

The computer 190 can be configured to interface with separate data storage equipment, such as through an internet connection, or through various forms of interconnection to a cloud computing interface to allow data received by the system 110 to be effectively stored and utilized not only by personnel adjacent the vehicle, but also at other locations.

More specifically, and with particular reference to FIGS. 1-5 and 8, basic details of the electro-scan probe 20 and the funnel plug 30 are described, according to this exemplary embodiment. The probe 20 is preferably elongate in form and is configured to be attached at each end thereof to separate cables. A rear end of the probe 20 is configured to be attached to the main cable 40 with an electric connection maintained therethrough. A lead end of the electro-scan probe 20 is configured to be attached to an electrode lead cable 42 or directly to the haul line, such as through threads 46 on the funnel plug. When coupled to the electrode lead cable 42, the probe 20 is coupled to the haul line through the funnel plug 30. Other details of the probe 20 are preferably similar to those of known electro-scan probes such as that described in U.S. Pat. No. 6,301,954.

The funnel plug 30 (FIGS. 1-3, 5 and 7-9), assists in keeping the sewer S filled with liquid adjacent the probe 20, while allowing liquid flow through the funnel plug 30 in the upstream direction from the hose of a hydraulic jet cleaning truck to keep the pipe full at the location of the probe such that complete data is collected by the system 10. The funnel plug 30 includes a rigid block 32 with a central bore 34 passing therethrough to facilitate liquid flow upstream. A crossbar 36 preferably spans the central bore 34. This crossbar 36 provides a convenient location for attachment of the electrode lead cable 42 so that the electrical probe 20 can be attached to the funnel plugs 30. A threaded tip 46 of the funnel plug 30 could be utilized for attachment to the haul line. This can occur by providing a threaded adapter to which the haul line is attached that can threadably attach to the threaded tip 46. As another option, a hose tip of a hydraulic jet cleaning truck can be threaded directly to the threaded tip 46 to both facilitate filling of the sewer S upstream of the plug 30 and advancing of the plug 30 and the probe 20 in a downstream direction (arrow D).

An extension tube 35 preferably extends forward of the block 32 with a generally cylindrical form surrounding the central bore 34 of the funnel plug 30. A skirt 38, preferably formed of a high strength but somewhat flexible and resilient rubber extends upstream from the extension tube 35. This skirt 38 has a conical form. Preferably, a rearmost upstream portion of the skirt 38 defines a greatest diameter portion of the skirt 38 which is slightly greater than a diameter of the sewer line S, such that the skirt 38 brushes against walls of the sewer line S as the funnel plug 30 passes through the sewer line S. With larger sewers S, the plug 30 can be replaced with a haul line directly attached to the probe 20 and a blockade such as a large pneumatic sewer plug with bypass installed downstream of the downstream manhole M2.

With particular reference to FIGS. 1-6, details of the main cable 40 and side wedge pulley 50 for routing of the main cable 40 into the sewer S, are described, according to this exemplary embodiment. The main cable 40 is a ruggedized elongate cable that may have multiple conductors. For operation of the system 10 merely with the electro-scan probe 20, as few as two conductor pathways could be provided within the main cable 40. Most preferably, the main cable 40 has multiple conductive pathways so that the main cable 40 can be utilized both with the electro-scan probe 20 of this preferred embodiment, and to also allow the main cable 40 to be utilized with a camera 125 (FIG. 16), such as a camera which requires power along one electrically conductive pathway, and an image signal translated along a separate conductive pathway, and potentially also control signals for the camera, such as zoom control, tilt control, pan control and other camera controls.

The main cable 40 has a free end to which the probe 20 is attached. In particular, the free end of the main cable 40 preferably includes a removable coupling 22 thereon. This coupling 22 is configured so that either the electro-scan probe 20 (FIG. 4) or the camera 125 (FIG. 16) can be connected to the free end of the cable 40 (or cable 130 in FIG. 16). This coupling 22 is preferably ruggedized so that it not only allows for electrical connection through the various different electrically conductive pathways of the main cable 40, but also to carry any tension loads existing between the probe 20 (or camera 125) and the main cable 40.

An end of the main cable 40 opposite the sensor end is coupled to the spool which preferably is part of a winch 140 assembly. This winch 140 or other spool support structure is preferably mounted within the vehicle 48 when the vehicle 48 is parked close to a first manhole M1 to allow the main cable 40 to be fed down through the manhole M1 into the sewer line S (FIGS. 1-3). Such feeding of the main cable 40 into the manhole M1 occurs along arrow B (FIGS. 1 and 2). The haul line is coupled to the probe 20 as well and provides a tension force (along arrow A of FIGS. 4 and 5) to draw the probe 20 along the sewer line S along with portions of the cable 40 (along arrow B of FIG. 4). The haul line is typically coupled to a separate vehicle where the haul line is routed up through a second manhole M2 (FIGS. 1 and 3). In one embodiment this separate vehicle is a jet wash vehicle commonly used with sewer S maintenance which can deploy and retract the haul line and is configured to provide the threading operations required in advance to couple the haul line to the probe 20.

Where the main cable 40 transitions through the manhole M1 to the sewer line S, it is beneficial to position at least one pulley to allow the main cable 40 to transition in direction from substantially vertically through the manhole M1 to substantially horizontal through the sewer line S (FIGS. 1-6). The side wedge pulley 50 provides a preferred structure to position such a pulley for handling of the main cable 40 as it is routed through the manhole M1 and into the sewer line S.

The side wedge pulley preferably includes a lower arm 52 and upper arm 54 which are both elongate and rigid, but preferably adjustable in length to have lengths similar to a width of the manhole M1. A pair of block plates 56 are preferably provided at common ends of the arms 52, 54 which block plates 56 are parallel to each other and have pulleys 58 mounted therebetween. The block plates 56 provide a preferred form of pulley 58 rotational support. Preferably three pulleys 58 are provided with central axes for the pulleys 58 oriented along an arc, and with the pulleys 58 having a similar diameter for smoothly transitioning the main cable 40 from translating substantially vertically to translating substantially horizontally.

To position the side wedge pulley 50 where shown in FIG. 4, the side wedge pulley 50 initially has the arms 52, 54 adjusted in length to be similar to the width of the manhole M1, but slightly longer than a width of the manhole M1 when factoring in portions of the block plates 56. The entire assembly of the side wedge pulley 50 is inserted down into the manhole M1 with the lower arm 52 having a distal end positioned near a bottom of the manhole M1 on a downstream edge of the manhole M1 (along arrow E of FIG. 4). The block plates 56 are allowed to engage a wall of the manhole M1 opposite the distal end of the lower arm 52. Such motion of the block plates 56 occurs along arrow F of FIG. 4.

The upper arm 54 can be held to allow for insertion of the lower arm 52 and the block plates 56 as described above.

Once the distal end of the lower arm 52 and block plates 56 are each in contact with opposite walls of the manhole M1, the upper arm 54 is rotated down into position with a distal end of the upper arm 54 abutting the same edge of the manhole M1 as the distal end of the lower arm 52 (along arrow G of FIG. 4). Note that the lower arm 52 is preferably fixed to the block plates 56 without rotation, but the upper arm 54 is allowed to pivotably attach to the block plates 56. Applying downward pressure on the upper arm 54, with the distal end of the upper arm 54 adjacent a wall of the manhole M1, the side wedge pulley 50 is wedged into the manhole M1 securely spanning a width of the manhole M1, and with the pulleys 58 positioned for routing of the main cable 40 as desired.

The electro-scan probe 20 can be in position adjacent the pulleys 58 before installation of the side wedge pulley 50. As an alternative, the coupling 22 can be detached from the probe 20 and sized small enough to fit between the block plates 56 and about the pulleys 58, so that the free end of the main cable 40 can be threaded adjacent the pulleys 58 and then have the probe 20 attached thereto, so that probe 20 deployment can occur after or before installation of the side wedge pulley 50.

In alternative embodiments more than three pulleys 58 or less than three pulleys 58, and conceivably merely one pulley 58, can be provided for the side wedge pulley assembly 50. As an alternative, the upper arm 54 can be fixed to the block plates 56 and the lower arm 52 can be pivotably attached to the block plates 56. It is also conceivable that to some extent each of the arms 52, 54 could be pivotably attached to the block plates 56.

The block plates 56 have a contour including an abutment surface configured to come into contact with a wall of the manhole M1 in a manner which acts to some extent like a "toggle" with greater lateral force being exerted as downward forces are applied to at least one of the arms 52, 54. In this way, the greater the downward force applied to the side wedge pulley assembly 50, the tighter the side wedge pulley 50 becomes secured within the manhole M1. For removal, the upper arm 54 can be lifted upward, detached from a wall of the manhole M1, and then further upward force on the upper arm 54 can dislodge the lower arm 52 and block plates 56 for removal of the assembly 50 from the manhole M1.

In an alternative embodiment, if it is desired to locate the side wedge pulley assembly 250 lower within the manhole M1, and adjacent the sewer line S, the alternate side wedge pulley 250 can be utilized (FIGS. 5 and 6). This alternative side wedge pulley 250 includes a lower arm 252 and upper arm 254 which are each attached to block plates 256 which support pulleys 258 therebetween. Uniquely, the alternate side wedge pulley 250 includes a crossbar 253 extending non-parallel from a distal end of the lower arm 252 (and preferably perpendicular to the lower arm 252). This crossbar 253 allows the distal end of the lower arm 252 to span the opening into the sewer line S downstream of the manhole M1 (as depicted in FIGS. 5 and 6). While the block plates 258 of the alternate side wedge pulley 250 are shown at a very bottom of the manhole M1, it could similarly be provided just above this lowermost position so that wedging across a width of the manhole M1 occurs just above the sewer line S. Other details and alternatives for the alternate side wedge pulley 250 can be similar to those provided with the side wedge pulley 50 of the first disclosed embodiment (FIG. 4).

With particular reference to FIGS. 15 and 16, details of the winch 70 or other spool support structure, and analysis assembly 80 typically supported within a vehicle 48 are described according to a typical embodiment. The winch 70 provides a preferred form of support for the spool which stores portions of the cable 40 (or cable 130 of FIG. 16) which are not in use yet, as the probe 20 migrates through the sewer line S (FIGS. 1-3). This winch 70 (or winch 140) is mounted within the vehicle 48 where power is supplied to the winch 70, 140 and data/signal transfer between the cable 40, 130 and the analysis assembly 80 (FIG. 15) can occur. A distance encoder 72 is preferably associated with the winch 70, such as by having a pulley over which the cable 40, 130 (FIG. 16) is routed.

As this distance encoder pulley rotates, this amount of rotation is measured so that an amount of cable played off of the spool of the winch 70, 140 can be measured. This measurement can be correlated with the position of the sensor end of the cable 40, 130, and in turn correlated with a position of the probe 120, 20 or camera 125.

The winch 70 typically has a central axis 74 which allows the spool to rotate to gather cable 40, 130, and deploy cable 40, 130 as desired. An attachment end of the cable 40, 130 opposite the sensor end is preferably coupled to a hub of the spool adjacent this central axis 74. Slip rings 76 are preferably provided in electrical communication with conductive pathways within the cable 40, 130 to allow for power and data transfer through the winch 140 or other spool support. This data and power are in turn coupled to an integration terminal 150 or other signal interconnection. Measurements from the distance encoder pulley 72 are preferably correlated with the data from the winch 140 at this integration terminal 150.

A yoke 160, 165 is coupled to this integration terminal 150. Preferably, a single yoke 160, 165 is provided, but multiple yokes including an electric probe yoke 160 and a camera yoke 165 could alternatively be coupled to the integration terminal 150. The camera terminal 175 or other camera signal processor and an electric probe terminal 170 or other electric probe signal processor are provided in a dual purpose vehicle system 110 (FIG. 16).

In a configuration where the vehicle 48 has been adapted to operate exclusively with the electro-scan probe 20 (FIG. 15), such a system 10 is configured with the integration terminal 150 merely adding distance encoder pulley 72 data to current/resistance data from the cable 40, 130 for transfer through a yoke 82 to a controller 84. The controller is also coupled to ground, such as through a ground wire 62 to a ground rod 60. In the dual purpose vehicle embodiment system 110, this ground rod 172 is coupled to the electric probe terminal 170. In turn, a computer 88 and joystick 86 or winch 70 control, interface with the controller 84. The computer 88 can in turn communicate with the internet, such as for various cloud computer offsite data processing procedures (FIG. 15).

When a dual purpose vehicle version of the system 110 is employed, a common joystick 180 and computer 190 can each interface with a camera terminal 175 (also referred to as a CCTV terminal) and also interface with an electro-scan probe input/output controller terminal 170. Thus, the system 10 or system 110 can either be configured for exclusive electro-scan probe 20 utilization or for selective use of either an electro-scan probe 120 or camera 125 utilizing much of the same equipment mounted within a vehicle 48 for logistical support and effective operation in the field.

With particular reference to FIGS. 1, 3, 10 and 11, details of a downstream bypass funnel plug 90 are described. This downstream bypass funnel plug 90 is preferably located within a downstream manhole M2, such as the same manhole M2 where the haul line 46 is routed into the sewer S. Either alone or in conjunction with the funnel plug 30, the downstream bypass funnel plug 90 functions to assist in keeping the sewer S fully filled with liquid so that the probe 20 can operate most effectively, for smaller sewers S. When the sewer is larger, the pneumatic plug referred to above would typically be utilized. The downstream bypass funnel plug 90 includes a skirt 92 of resilient rubber which is conical in form with a greatest diameter portion facing in an upstream direction and interfacing with walls of the sewer S (FIG. 10). A bypass tube 94 passes through the downstream bypass funnel plug 90 to function as an output line to allow liquid flow therethrough, such as in a downstream direction (along arrow D of FIGS. 10 and 11). An elbow 96 is provided which connects to this bypass tube and also to a standpipe 98 which extends upward from the elbow 96 defining an inlet line.

A height of the standpipe 98 can optionally be adjusted such as by removable attachment to the elbow 96. An upper end of the standpipe 98 extends up into the manhole M2 to an upper end. Liquid flow through the sewer S is trapped by the skirt 92 of the downstream bypass funnel plug 90, backing up the liquid L within the manhole M2 until it reaches the top of the standpipe 98. The liquid L can then pass through the standpipe 98, through the elbow 96, through the bypass tube 94 and on through the sewer line S.

The height of the standpipe 98 defines a liquid level L for liquid within the manhole M2, as well as generally a liquid level for portions of the sewer line S upstream of the manhole M2. By providing the standpipe 98 with a height a few inches above the top of the sewer pipe. The highest quality electric current/resistance readings can then be provided by the electro-scan probe 20 passing through the sewer line S. A U-bolt or other handle is shown on the downstream bypass funnel plug 90 which can be utilized to assist in placement and removal of the downstream bypass funnel plug 90.

With the system 10 of this invention, and the system 110 of this invention, electro-scan probe 20, 120 based sewer defect identification analysis can occur utilizing much of the equipment within an existing CCTV vehicle (FIG. 14). The system 10 of this invention can be deployed by adapting such a CCTV vehicle (FIG. 14) to operate as an electro-scan vehicle (FIG. 15). With the system 110, electric probe 120 operation can be provided selectively in conjunction with camera 125 operation utilizing much of the same equipment to provide a dual purpose vehicle according to the system 110 (FIG. 16).

When operating using the camera 125, a camera signal pathway is provided. This pathway extends from the camera 125 through the cable 130 to the winch 140 and then through the yoke 165 to the camera terminal 175 for viewing with the computer 190. When operating using the electric probe 120, an electric leak detection signal pathway is provided. This pathway extends from the probe 120 through the cable 130 to the winch 140 and then through the yoke 160 to the electro-scan probe terminal 170 for viewing of signal related data with the computer 190.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A method for integrating electro-scan into a video camera based sewer defect identification vehicle, including the steps of:
   identifying a vehicle configured for video camera based visual sewer defect identification including a video camera, a signal transmitting cable having multiple conductors with the camera coupled thereto, a spool for cable storage, a cable deployment distance sensor, a camera signal evaluation station including access to data from the distance sensor, a signal interconnection between the spool and the camera signal evaluation station and a camera signal pathway extending from the camera through at least a portion of the cable and then through the signal interconnection to the camera signal evaluation station;
   providing an electro-scan sewer defect identification probe;
   exchanging the camera for the probe relative to the cable;
   providing an electro-scan probe signal evaluation station including access to data from the distance sensor, the electro-scan probe signal evaluation station located on the vehicle;
   providing a grounding element and coupling it to ground;
   transitioning the signal interconnection to be located between the spool and the electro-scan probe signal evaluation station;
   defining an electric leak detection signal pathway extending from the probe through at least a portion of the cable and then through the signal interconnection to the probe signal evaluation station along with reference to the grounding element;
   wherein said exchanging step includes providing the camera signal transmitting cable with a free end adapted to extend more distant from the vehicle than an attachment end opposite the free end, the free end of the cable including a cable coupling thereon adapted to be removably attached to either the camera or the probe;
   wherein said transitioning step includes a yoke between an output of the signal interconnection and the camera signal evaluation station;
   disconnecting the yoke;
   attaching the yoke to the electro-scan probe signal evaluation station; and
   coupling the probe to a haul line routed along the sewer line and spaced from the input manhole.

2. The method of claim 1 including the further step of configuring a computer monitor to access both the camera signal evaluation station and the probe signal evaluation station.

3. The method of claim 2 including the further step of configuring a cable position input for spool rotational control within the vehicle and adjacent the computer monitor.

4. The method of claim 3 including the further step of configuring the spool as a winch with rotational control for the spool coupled to the cable position input.

5. The method of claim 3 including the further step of configuring the spool to include at least two slip rings to electrically connect an attachment end of the cable opposite a free end to the signal interconnection, regardless of the rotational position of the spool.

6. The method of claim 1 including the further step of routing the cable over pulleys of a removable side wedge pulley positioned within a cable input manhole accessing a sewer line to be evaluated for defects.

7. The method of claim 1 wherein said probe advances downstream away from the cable input manhole by action of haul line forces acting upon the probe, the sewer line kept substantially full of liquid adjacent the probe to provide a full electric signal pathway between the probe and walls of the sewer.

8. The method of claim 7 including the further step of attaching a funnel plug to the haul line downstream of the probe.

9. The method of claim 7 including the further step of locating a bypass funnel plug downstream of the sewer line to be evaluated for defects, with the downstream bypass funnel plug including an input line elevated above an output line by a height sufficient to keep portions of the sewer lines to be evaluated substantially full of liquid as the probe passes therethrough.

10. A method for pipe defect identification, including the steps of:
    identifying a camera;
    identifying an electro-scan probe;
    coupling the camera to a spool through an electric signal transmitting cable having multiple conductors, also joined to a camera signal processor;
    advancing the camera through a pipe to be analyzed for leaks;
    keeping track of a position of the camera at least partially based on an amount of cable played off of the spool;
    correlating camera image signal data with camera position;
    replacing the camera with the electro-scan probe on the electric signal transmitting cable;
    coupling a haul line to the probe;
    affixing a ground rod to ground outside of an interior of the pipe to be analyzed;
    pulling the probe through the pipe;
    keeping track of a position of the probe at least partially based on an amount of cable played off of the spool;
    correlating electric current signal data from the probe with a position of the probe;
    wherein said keeping track of a position of the camera step and said keeping track of a position of the probe step utilize a common cable position sensor;
    wherein a signal interconnection is provided adjacent the spool and configured to receive a signal both when the camera is attached to the cable and when the probe is attached to the cable, the signal interconnection adapted to be selectively attached to either a camera signal processor or an electro-scan probe signal processor; and
    wherein a common vehicle supports the spool, the camera signal processor and the electro-scan probe signal processor.

11. The method of claim 10 including the further step of routing the cable through a manhole and into a pipe to be evaluated; and
    positioning at least one pulley within the manhole and routing the cable about the pulley to transition cable movement from substantially vertical through the manhole to substantially horizontal through a pipe coupled to the manhole.

12. The method of claim 11 including the further step of mounting the at least one pulley to a pulley rotational support with a lower arm extending from the pulley rotational support and an upper arm extending from the pulley rotational support, at least one of the arms pivotably attached to the pulley support, each of the arms having a length sufficient to span a width of the manhole.

13. The method of claim 12 wherein said mounting step includes configuring the lower arm with a crossbar thereon, the crossbar non-parallel with the lower arm.

14. The method of claim 10 including the further step of attaching a funnel plug between the haul line and the electro-scan probe, the funnel plug enhancing a degree to which the pipe remains filled with liquid adjacent the probe.

15. The method of claim 10 wherein a downstream bypass line is located at an end of a pipe to be evaluated spaced from where the cable accesses the pipe, and below where the cable accesses the pipe, the downstream bypass funnel plug including an inlet and an output, the inlet located above the output by a height sufficient to submerge portions of the pipe where the probe is located.

16. The method of claim 10 wherein a terminal is provided with a computer monitor which computer monitor can access both the camera signal processor and the electro-scan probe signal processor to evaluate leak detection information from either the camera or the electro-scan probe, depending on whether the camera is attached to the cable or the electro-scan probe is attached to the cable.

* * * * *